United States Patent
Lee

(10) Patent No.: US 12,332,070 B2
(45) Date of Patent: *Jun. 17, 2025

(54) METHOD AND APPARATUS FOR SETTING DESTINATION IN NAVIGATION TERMINAL

(71) Applicant: Samsung Electronics Co., Ltd., Gyeonggi-do (KR)

(72) Inventor: Dong-Jun Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,193

(22) Filed: Oct. 25, 2023

(65) Prior Publication Data

US 2024/0068832 A1 Feb. 29, 2024

Related U.S. Application Data

(63) Continuation of application No. 17/362,324, filed on Jun. 29, 2021, now Pat. No. 11,828,612, which is a (Continued)

(30) Foreign Application Priority Data

Feb. 22, 2006 (KR) .......................... 10-2006-0017457

(51) Int. Cl.
*G01C 21/36* (2006.01)

(52) U.S. Cl.
CPC .................................. *G01C 21/362* (2013.01)

(58) Field of Classification Search
CPC ....... G01C 21/362; A47G 7/041; A01G 9/023
(Continued)

(56) References Cited

U.S. PATENT DOCUMENTS

| 5,155,689 A | 10/1992 | Wortham |
| 6,421,009 B2 | 7/2002 | Suprunov |

(Continued)

FOREIGN PATENT DOCUMENTS

| GB | 2385748 | * | 2/2002 |
| JP | 2000-020528 | | 1/2000 |

(Continued)

OTHER PUBLICATIONS

U.S. Office Action dated Aug. 6, 2021 issued in counterpart U.S. Appl. No. 16/837,414, 11 pages.

(Continued)

*Primary Examiner* — Muhammad Shafi
(74) *Attorney, Agent, or Firm* — The Farrell Law Firm, P.C.

(57) ABSTRACT

A method and an apparatus are provided for a displaying a route in a first electronic device. A first message is received from a second electronic device. First position information included in the first message is identified. The first position information includes position information of the second electronic device. A user input for selecting the first message from a plurality of messages is received. Position information of the first electronic device is calculated. Route information between a start position and a destination position is received from a navigation server. The start position corresponds to the position information of the first electronic device and the destination position corresponds to the position information of the second electronic device. Based at least on receiving the route information from the navigation server, a route representing the received route information between the start position and the destination position is displayed on the first electronic device.

15 Claims, 6 Drawing Sheets

Related U.S. Application Data continuation of application No. 16/883,219, filed on May 26, 2020, now Pat. No. 11,073,395, which is a continuation of application No. 16/121,051, filed on Sep. 4, 2018, now Pat. No. 10,704,911, which is a continuation of application No. 13/854,509, filed on Apr. 1, 2013, now Pat. No. 10,066,943, which is a continuation of application No. 13/551,172, filed on Jul. 17, 2012, now Pat. No. 8,412,457, which is a continuation of application No. 11/709,912, filed on Feb. 22, 2007, now Pat. No. 8,249,808.

(58) Field of Classification Search
USPC .......................................................... 701/537
See application file for complete search history.

(56) References Cited

U.S. PATENT DOCUMENTS

| | | | |
|---|---|---|---|
| 6,999,754 B2 | 2/2006 | Hashimoto et al. | |
| 7,085,629 B1 | 8/2006 | Gotou et al. | |
| 7,373,247 B2 | 5/2008 | Park | |
| 7,788,001 B2 | 8/2010 | Mafune | |
| 2002/0055362 A1 | 5/2002 | Aoyama | |
| 2002/0059296 A1 | 5/2002 | Hayashl | |
| 2002/0118723 A1 | 8/2002 | McCrady et al. | |
| 2003/0036391 A1 | 2/2003 | Jordan | |
| 2003/0040300 A1 | 2/2003 | Bodlc | |
| 2004/0203919 A1 | 10/2004 | Ross | |
| 2005/0020209 A1 | 1/2005 | Camp, Jr. | |
| 2005/0054291 A1 | 3/2005 | Park | |
| 2005/0222763 A1 | 10/2005 | Uyeki | |
| 2005/0239442 A1 | 10/2005 | Chen | |
| 2005/0242970 A1 | 11/2005 | Blaker et al. | |
| 2005/0249172 A1 | 11/2005 | Malik | |
| 2005/0256635 A1 | 11/2005 | Gardner et al. | |
| 2006/0068762 A1 | 3/2006 | Baldwin | |
| 2006/0069503 A1* | 3/2006 | Suomela | G01C 21/3641 701/431 |
| 2006/0121917 A1* | 6/2006 | Shin | H04W 64/00 455/456.5 |
| 2006/0141923 A1 | 6/2006 | Goss | |
| 2006/0178105 A1 | 8/2006 | Kim | |
| 2006/0212818 A1 | 9/2006 | Lee | |
| 2006/0241857 A1 | 10/2006 | Onishi | |
| 2007/0010261 A1* | 1/2007 | Dravida | H04L 12/5692 455/456.3 |
| 2007/0198731 A1* | 8/2007 | Li | H04M 1/72439 709/230 |

FOREIGN PATENT DOCUMENTS

| | | |
|---|---|---|
| JP | 3490261 | 11/2003 |
| JP | 2004-151068 | 5/2004 |
| JP | 2004-271335 | 9/2004 |
| JP | 2004-294376 | 10/2004 |
| JP | 2005-043076 | 2/2005 |
| JP | 2005-084997 | 3/2005 |
| JP | 2005-098940 | 4/2005 |
| JP | 2005-181262 | 7/2005 |
| JP | 2005-318171 | 11/2005 |
| JP | 2005-345151 | 12/2005 |
| JP | 2006-033008 | 2/2006 |
| KR | 1020010047166 | 6/2001 |
| KR | 1020020030986 | 4/2002 |
| KR | 10-0383605 | 4/2003 |
| KR | 1020040026469 | 3/2004 |
| KR | 10-0474164 | 2/2005 |
| KR | 1020050054369 | 6/2005 |
| KR | 1020050055241 | 6/2005 |
| KR | 1020050115452 | 12/2005 |
| KR | 1020050120982 | 12/2005 |
| KR | 1020050121188 | 12/2005 |
| KR | 1020060006992 | 1/2006 |
| KR | 1020060007215 | 1/2006 |
| WO | WO 2004/076976 | 9/2004 |

OTHER PUBLICATIONS

U.S. Office Action dated Nov. 7, 2022 issued in counterpart U.S. Appl. No. 16/837,414, 14 pages.

* cited by examiner

METHOD AND APPARATUS FOR SETTING DESTINATION IN NAVIGATION TERMINAL

PRIORITY

This application is a Continuation Application of U.S. application Ser. No. 17/362,324, filed in the U.S. Patent and Trademark Office (USPTO) on Jun. 29, 2021, now U.S. Pat. No. 11,828,612, issued on Nov. 28, 2023, which is a Continuation Application of U.S. application Ser. No. 16/883,219, filed in the USPTO on May 26, 2020, now U.S. Pat. No. 11,073,395, issued on Jul. 27, 2021, which is a Continuation Application of U.S. application Ser. No. 16/121,051, filed in the USPTO on Sep. 4, 2018, now U.S. Pat. No. 10,704,911, issued on Jul. 7, 2020, which is a Continuation Application of U.S. patent application Ser. No. 13/854,509, filed in the USPTO on Apr. 1, 2013, now U.S. Pat. No. 10,066,943, issued on Sep. 4, 2018, which is a Continuation Application of U.S. patent application Ser. No. 13/551,172, filed in the USPTO on Jul. 17, 2012, now U.S. Pat. No. 8,412,457, issued on Apr. 2, 2013, which is a Continuation Application of U.S. patent application Ser. No. 11/709,912, filed in the USPTO on Feb. 22, 2007, now U.S. Pat. No. 8,249,808, issued on Aug. 21, 2012, which claims priority under 35 U.S.C. § 119 to an application filed in the Korean Intellectual Property Office on Feb. 22, 2006 and assigned Serial No. 10-2006-0017457, the contents of each of which are incorporated herein by reference.

BACKGROUND OF THE INVENTION

1. Field of the Invention

The present invention relates generally to a navigation system, and in particular, to a method and apparatus for setting a destination in a navigation terminal.

2. Description of the Related Art

In common, a navigation system is a system for informing a driver of a moving body, such as a vessel, an airplane, or a vehicle, of a current position of the moving body and calculating an optimum route to a desired destination, and guiding the driver along the optimum route.

The navigation system can be constructed with a client-server structure including a navigation server for providing a navigation service or data needed to the navigation service, and a user navigation terminal for using the navigation service provided by the navigation server.

The navigation server provides a current position and a route to a position desired by a user, various kinds of data corresponding to the navigation service, or data needed to the navigation service. The navigation terminal downloads a route or various kinds of navigation service data from the navigation server using an exclusively produced navigation program and provides the route or various kinds of navigation service data to the user, or provides the navigation service without the navigation server.

Since the navigation system can be linked to a mobile communication network, the various kinds of data provided by the navigation server can be transmitted to the navigation terminal via the mobile communication network, and moreover, the navigation terminal can perform mobile communication. The navigation terminal also can access the navigation server via the mobile communication network and request the navigation server for various kinds of services or data.

The navigation system is available on the market, providing user-friendliness. In particular, a function of calculating and providing a route between a current position and a specific position can help a navigation user arrive at a destination. To calculate the route, coordinates of the current position and coordinates of the specific position, i.e., the destination, are required. A navigation terminal using a Global Positioning System (GPS) receiver included in the navigation terminal or a user input can set the current position coordinates. However, the destination position coordinates can be set only by a user input. The user input for the destination position coordinates can be achieved by directly inputting an address of the destination, or searching previously stored map data and selecting the destination.

When the destination is set, the destination position coordinates should be correctly input using a correct address or navigation terminal-recognizable data. This means that the user should know the correct address or a geographical position of the destination. Thus, if the user does not know the address of the destination or the correct geographical position of the destination, or if the destination is not a specific region or feature, for example, if the destination is a certain position of a highway or the mid-slope of a certain mountain, it is difficult to set the destination.

SUMMARY OF THE INVENTION

An object of the present invention is to substantially solve at least the above problems and/or disadvantages and to provide at least the advantages herein below. Accordingly, an object of the present invention is to provide a method and apparatus for conveniently setting a destination in a navigation terminal.

According to the aspect of the present invention there is provided a method and apparatus for correctly setting a destination even when a user does not know a correct address of the desired destination.

According to another aspect of the present invention, there is provided a method and apparatus for correctly setting a desired destination even when the destination is not a specific region or feature.

According to an aspect of the present invention, a method is provided for displaying a route in a first electronic device. A first message is received from a second electronic device. First position information included in the first message is identified. The first position information includes position information of the second electronic device calculated based on a first global positioning system (GPS) signal received by the second electronic device. A user input for selecting the first message from a plurality of messages is received. The plurality of messages includes the first message and at least one second message received before the receipt of the first message. The at least one second message includes position information. Position information of the first electronic device is calculated based on a second GPS signal received by the first electronic device. Route information between a start position and a destination position is received from a navigation server. The start position corresponds to the position information of the first electronic device and the destination position corresponds to the position information of the second electronic device in the first message selected by the user input. Based at least on receiving the route information from the navigation server, a route representing the received route information between the start position and the destination position is displayed on a display of the first electronic device.

According to another aspect of the present invention, a first electronic device is provided for displaying route. The first electronic device includes a display, a communication interface, and a processor. The processor is configured to receive a first message from a second electronic device through the communication interface, and identify first position information included in the first message. The first position information includes position information of the second electronic device calculated based on a first GPS signal received by the second electronic device. The processor is also configured to receive a user input for selecting the first message from a plurality of messages. The plurality of messages includes the first message and at least one second message received before the receipt of the first message. The at least one second message includes position information. The processor is further configured to calculate position information of the first electronic device based on a second GPS signal received by the first electronic device, and receive route information between a start position and a destination position from a navigation server. The start position corresponds to the position information of the first electronic device and the destination position corresponds to the position information of the second electronic device in the first message selected by the user input. Based at least on receiving the route information from the navigation server, the processor is configured to display a route representing the received route information between the start position and the destination position on a display of the first electronic device.

According to another aspect of the present invention, a non-transitory computer readable recording medium is provided that stores instructions executable by a processor of a first electronic device. The instructions cause the processor to at least receive a first message from a second electronic device through the communication interface, and identify first position information included in the first message. The first position information includes position information of the second electronic device calculated based on a first GPS signal received by the second electronic device. The instructions also cause the processor to receive a user input for selecting the first message from a plurality of messages. The plurality of messages includes the first message and at least one second message received before the receipt of the first message. The at least one second message includes position information. The instructions further cause the processor to calculate position information of the first electronic device based on a second GPS signal received by the first electronic device, and receive route information between a start position and a destination position from a navigation server. The start position corresponds to the position information of the first electronic device and the destination position corresponds to the position information of the second electronic device in the first message selected by the user input. Based at least on receiving the route information from the navigation server, the instructions cause the processor to display a route representing the received route information between the start position and the destination position on a display of the first electronic device.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF EMBODIMENTS OF THE PRESENT INVENTION

Figure 1:
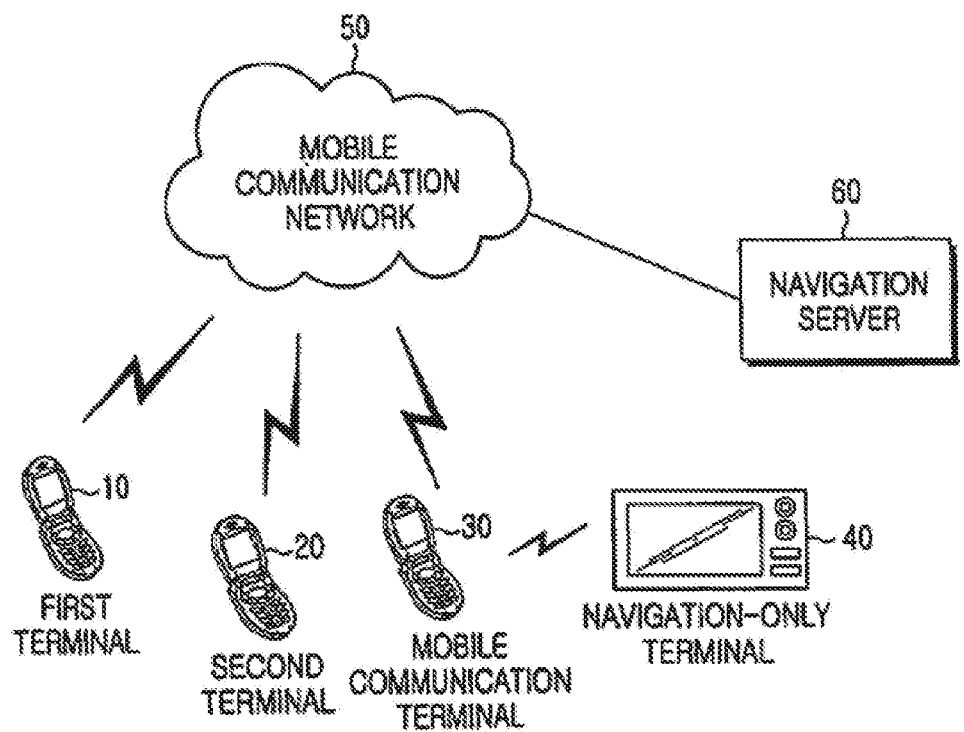
FIG. 1 is a diagram illustrating a configuration of a navigation system to which the present invention is applied.

Embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

FIG. 1 is a diagram illustrating a configuration of a navigation system to which the present invention is applied. Referring to FIG. 1, the navigation system includes navigation terminals 10 and 20 for supporting mobile communication, an exclusive navigation terminal (or navigation-only terminal) 40, a mobile communication terminal 30 linked to the exclusive navigation terminal 40, a navigation server 60, and a mobile communication network 50.

The mobile communication network 50 includes a plurality of Base Transceiver Stations (BTSs) (not shown), a plurality of Base Station Controllers (BSCs) (not shown), a plurality of Mobile Switching Centers (MSCs) (not shown), as well as a message server (not shown) and provides a mobile communication service and a wireless data service. The message server provides a Short Message Service (SMS) and a Multimedia Message Service (MMS) to terminals connected to the mobile communication network 50, whereby short messages and multimedia messages are transmitted and received between the terminals connected to the mobile communication network 50.

By storing various modes of map data and including a route calculation module (not shown), the navigation server 60 provides guidance information by calculating a current position of a certain terminal and a route to a specific destination, which are requested by the certain terminal, and provides data, such as map data, required for a navigation service in response to a request of the certain terminal. The navigation server 60 also provides various types of the navigation service such as a route guidance service, a traffic information service, and a map information service. The navigation server 60 frequently updates the navigation service according to a rapid service change.

The navigation terminals 10 and 20 for supporting mobile communication can be user terminals, e.g., cellular phones, which have subscribed for the navigation service, and have an exclusive navigation program for receiving the navigation service. A first navigation terminal 10 (hereinafter "first terminal") of the navigation terminals 10 and 20 directly calculates a current position thereof or a route to a specific destination by including a route calculator according to the present invention.

A second navigation terminal 20 (hereinafter "second terminal") of the navigation terminals 10 and 20 requests the navigation server 60 through the mobile communication network 50 to calculate a current position thereof or a route to a specific destination according to the present invention. The navigation server 60 calculates the current position or route of the second terminal 20 and provides the calculated current position or route to the second terminal 20. The second terminal 20 displays the calculated current position or route, which has received from the navigation server 60, to a user.

Although the mobile communication terminal 30 does not have the exclusive navigation program, the mobile communication terminal 30 transmits navigation related data received from the navigation server 60 through the mobile communication network 50 to the exclusive navigation terminal 40 by connecting to the exclusive navigation terminal 40. Although the exclusive navigation terminal 40 does not have a mobile communication function according to the present invention, the exclusive navigation terminal 40 has the exclusive navigation program for providing the navigation service, calculates a current position thereof or a route to a specific destination and provides the calculated result to a user, and stores the navigation related data input from the mobile communication terminal 30 or provides the navigation service using the navigation related data.

In the navigation system having the above-described configuration, each of the terminals 10, 20, 30 and 40 transmits a position information multimedia message in which current position information is included in a multimedia message to a certain terminal through the mobile communication network 50, according to the present invention. If each of the terminals 10, 20, 30 and 40 receives a position information multimedia message from other terminals, each of the terminals 10, 20, 30 and 40 confirms the position information multimedia message, sets a destination by setting destination position coordinates corresponding to position information included in the position information multimedia message, and directly calculates a route or requests the navigation server 60 to calculate the route.

Figure 5:
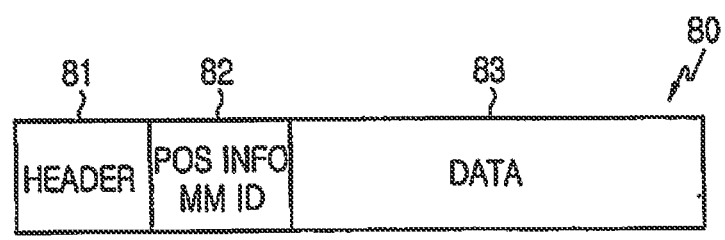
FIG. 5 is a diagram illustrating a configuration of a position information Multimedia Message (MM) according to the present invention.

The position information multimedia message is a multimedia message including certain position information and it can be configured as illustrated in FIG. 5. FIG. 5 is a configuration of a position information multimedia message 80 according to the present invention. Referring to FIG. 5, the position information multimedia message 80 includes a header 81, a position information multimedia message identification field 82, and a data field 83. Header information of the position information multimedia message 80 is stored in the header 81. Information indicating that the position information multimedia message 80 is a multimedia message including position information of a certain terminal is stored in the position information multimedia message identification field 82. When each of the terminals 10, 20, 30 and 40 receives a multimedia message, each of the terminals 10, 20, 30 and 40 determines by checking the position information multimedia message identification field 82 whether the received multimedia message is a position information multimedia message 80. Position information is stored in the data field 83. The position information is formed in a format recognizable when each of the terminals 10, 20, 30 and 40 provides the navigation service, and for example, can be formed with specific position coordinates or address information of a navigation service format. Although the position information multimedia message 80 in which the header 81 and the position information multimedia message identification field 82 are separated has been illustrated, position information multimedia message identification can be included in the header 81.

Figure 2:
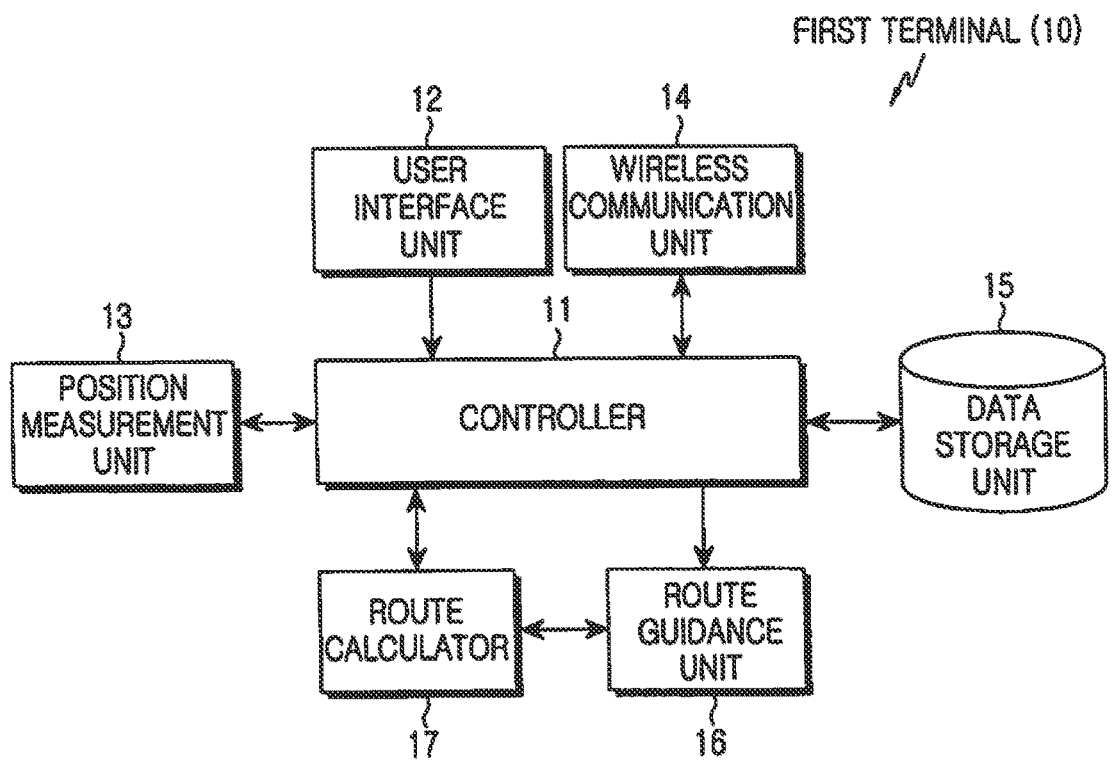
FIG. 2 is a block diagram illustrating a first navigation terminal according to the present invention.

Configurations and their operations of the terminals 10, 20, and 30 and 40 will now be described with reference to FIGS. 2, 3, 4, 6, and 7. A configuration and its operation of the first terminal 10 including a route calculator 17 will be described first. FIG. 2 is a block diagram of the first terminal 10 according to the present invention.

Referring to FIG. 2, the first terminal 10 includes a controller 11, a user interface unit 12, a position measurement unit 13, a wireless communication unit 14, a data storage unit 15, a route guidance unit 16 and a route calculator 17.

The user interface unit 12 can include a keypad or a touch panel and performs an interface between a user and the first terminal 10. For example, the user interface unit 12 outputs a current position calculation request or a route guidance request to the controller 11 in response to a user input. The wireless communication unit 14 performs communication with the navigation server 60 through the mobile communication network 50, and transmits a navigation service request to the navigation server 60 and receives data corresponding to the navigation service request from the navigation server 60 under a control of the controller 11. The wireless communication unit 14 also transmits and receives a multimedia message through the mobile communication network 50 under a control of the controller 11. The data storage unit 15 stores map data and program data needed for the navigation service. The data storage unit 15 also stores a position information multimedia message 80 received from another terminal according to a preferred embodiment of the present invention. The position measurement unit 13 receives a signal needed to calculate a current position, such as a GPS signal, and outputs the received signal to the controller 11. The route guidance unit 16 outputs the map data or performs a route guidance using route information and the map data. The controller 11 controls the route calculator 17 to calculate a current position of the first terminal 10 using the signal received through the position measurement unit 13 and output the calculation result to the route guidance unit 16, or calculate a route from a certain position to another position in response to a route search request, combine the calculation result with the map data, and output the combined result to the route guidance unit 16.

The controller 11 controls a general operation of the first terminal 10 according to of the present invention and sets and stores a route search mode for each route, such as a start position, a passage course, and a destination, which are input through the user interface unit 12. If a current position calculation request or a route search request is input, the controller 11 controls the route calculator 17 to calculate a current position or a route corresponding to the set route search mode and performs a control required to output the calculation result. The controller 11 controls the position measurement unit 13 and the route calculator 17 to calculate a current position of the first terminal 10, and transmits a position information multimedia message 80 including the calculated current position coordinates to a certain terminal or transmits a position information multimedia message 80 including address information input by the user to a certain terminal. The controller 11 determines whether a multimedia message received through the wireless communication unit 14 is a position information multimedia message 80, if the received multimedia message is a position information multimedia message 80, the controller 11 sets a specific destination by setting destination position coordinates corresponding to position information included in the received position information multimedia message 80 according to a user's selection and requests the route calculator 17 to search a route between a start position and the desired destination. In this case, the controller 11 can store the received position information multimedia message 80, and can set destination position coordinates corresponding to position information included in a received latest position information multimedia message 80 or set destination position coordinates corresponding to position information included in a position information multimedia message 80 selected by the user from among a plurality of previously received and stored position information multimedia messages 80, according to a user's setting.

Figure 6:
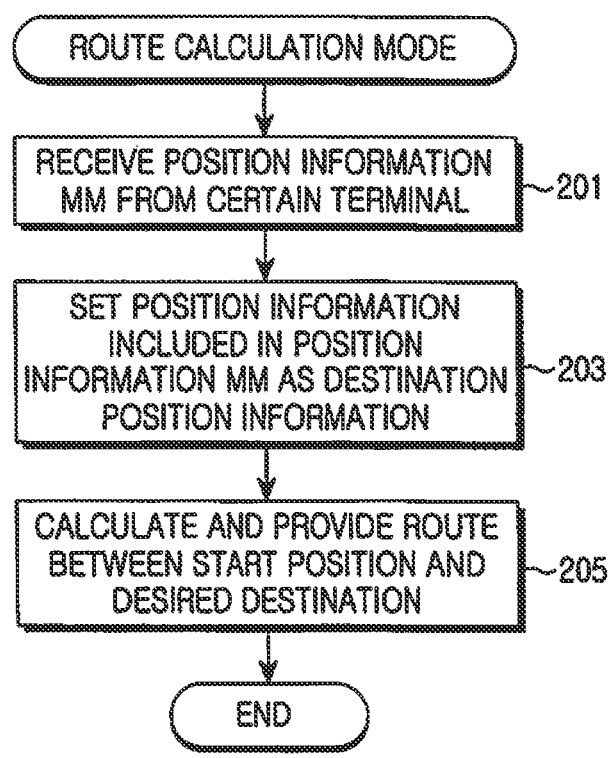
FIG. 6 is a flowchart illustrating an operation of a navigation terminal according to the present invention.

An operation of a case where the first terminal 10 receives a position information multimedia message 80 is illustrated in FIG. 6. FIG. 6 is a flowchart illustrating an operation of a navigation terminal, i.e., the first terminal 10, according to of the present invention. Referring to FIG. 6, the first terminal 10 receives a position information multimedia message 80 from a certain terminal in a route calculation mode in step 201. The first terminal 10 sets destination position coordinates corresponding to position information included in the position information multimedia message 80 in step 203. The first terminal 10 calculates and provides a route between a start position and a destination in step 205.

Figure 3:
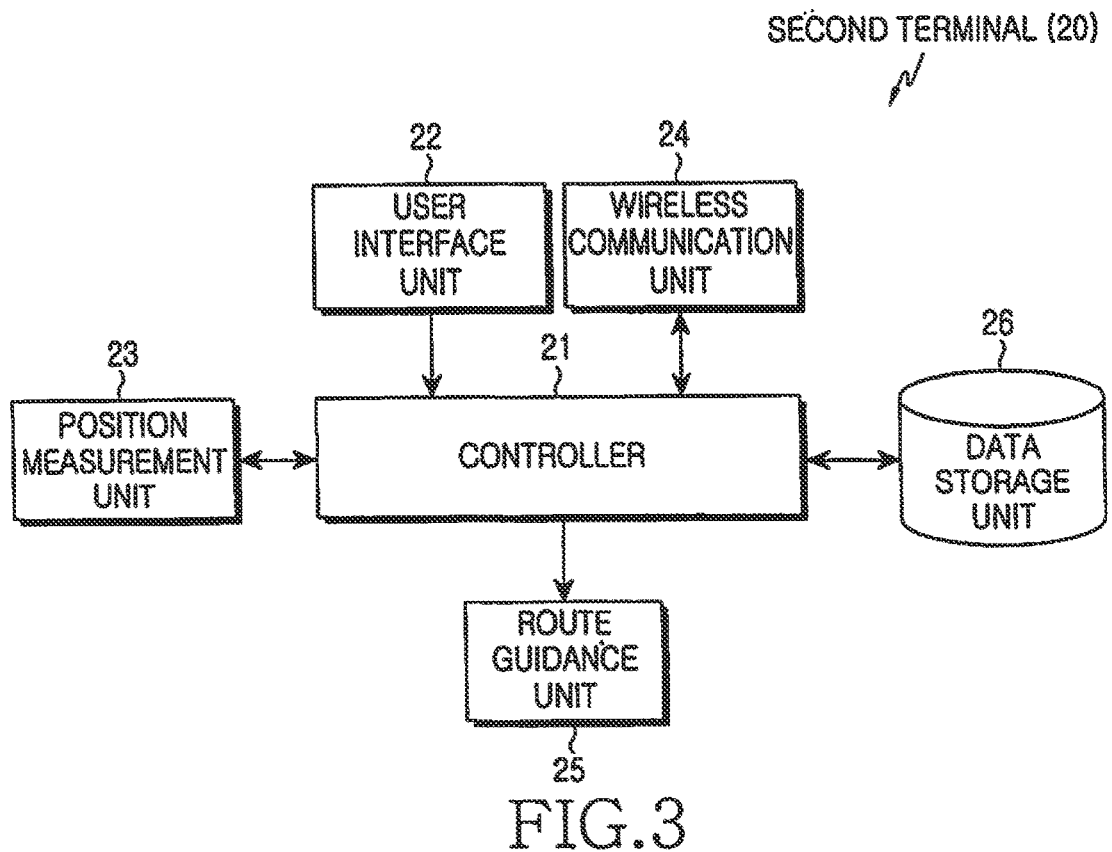
FIG. 3 is a block diagram of a second navigation terminal according to the present invention.

A configuration and its operation of the second terminal 20 providing the navigation service by accessing the navigation server 60 will be described herein with reference to FIG. 3. FIG. 3 is a block diagram of the second terminal 20 according to the present invention. Referring to FIG. 3, the second terminal 20 includes a controller 21, a user interface unit 22, a position measurement unit 23, a wireless communication unit 24, a data storage unit 26, and a route guidance unit 25.

The user interface unit 22 can include one of a keypad or a touch panel and performs an interface between a user and the second terminal 20. The position measurement unit 23 receives a signal needed to calculate a current position, such as a GPS signal, and outputs the received signal to the controller 21. The wireless communication unit 24 performs communication with the navigation server 60 through the mobile communication network 50, and transmits a map data update request, a current position calculation request, or a search request of a route between a certain start position and a desired destination to the navigation server 60 under a control of the controller 21. In this case, the wireless communication unit 24 can transmit the signal required to calculate a current position, which is measured by the position measurement unit 23, under a control of the controller 21. The wireless communication unit 24 receives current position information, route information, and map data from the navigation server 60. The wireless communication unit 24 also transmits and receives a multimedia message through the mobile communication network 50 under a control of the controller 21. The data storage unit 26 stores map data and program data needed for the navigation service. The data storage unit 26 also stores a position information multimedia message 80 received from another terminal according to the present invention. The route guidance unit 25 outputs the map data received by the wireless communication unit 24 or performs a route guidance using the route information and the map data.

The controller 21 controls a general operation of the second terminal 20 and sets and stores a route search mode for each route, such as a start position, a passage course, and a desired destination, which are input through the user interface unit 22. If a current position calculation request or a route search request is input by the user, the controller 21 performs a transmission control of a corresponding request to the navigation server 60 and performs a control required to output a calculation result received from the navigation server 60. The controller 21 transmits a position information multimedia message 80 including current position coordinates of the second terminal 20 to a certain terminal or transmits a position information multimedia message 80 including address information input by the user to a certain terminal. The controller 21 determines whether a multimedia message received through the wireless communication unit 24 is a position information multimedia message 80, if the received multimedia message is a position information multimedia message 80, the controller 21 sets destination position coordinates corresponding to position information included in the received position information multimedia message 80 according to a user's selection and requests the navigation server 60 to search a route between the set start position and the set destination. In this case, the controller 21 can store the received position information multimedia message 80, and can set destination position coordinates corresponding to position information included in a received latest position information multimedia message 80 or set destination position coordinates corresponding to position information included in a position information multimedia message 80 selected by the user from among a plurality of previously received and stored position information multimedia messages 80, according to a user's setting.

In response to the route search request of the second terminal 20, the navigation server 60 calculates a route using position coordinates of the start position and the desired destination included in the route search request and transmits the calculated route to the second terminal 20.

As described above, the second terminal 20 can request the navigation server 60 for a route search by setting a desired destination as the destination position coordinates corresponding to position information included in a received position information multimedia message 80.

Figure 4:
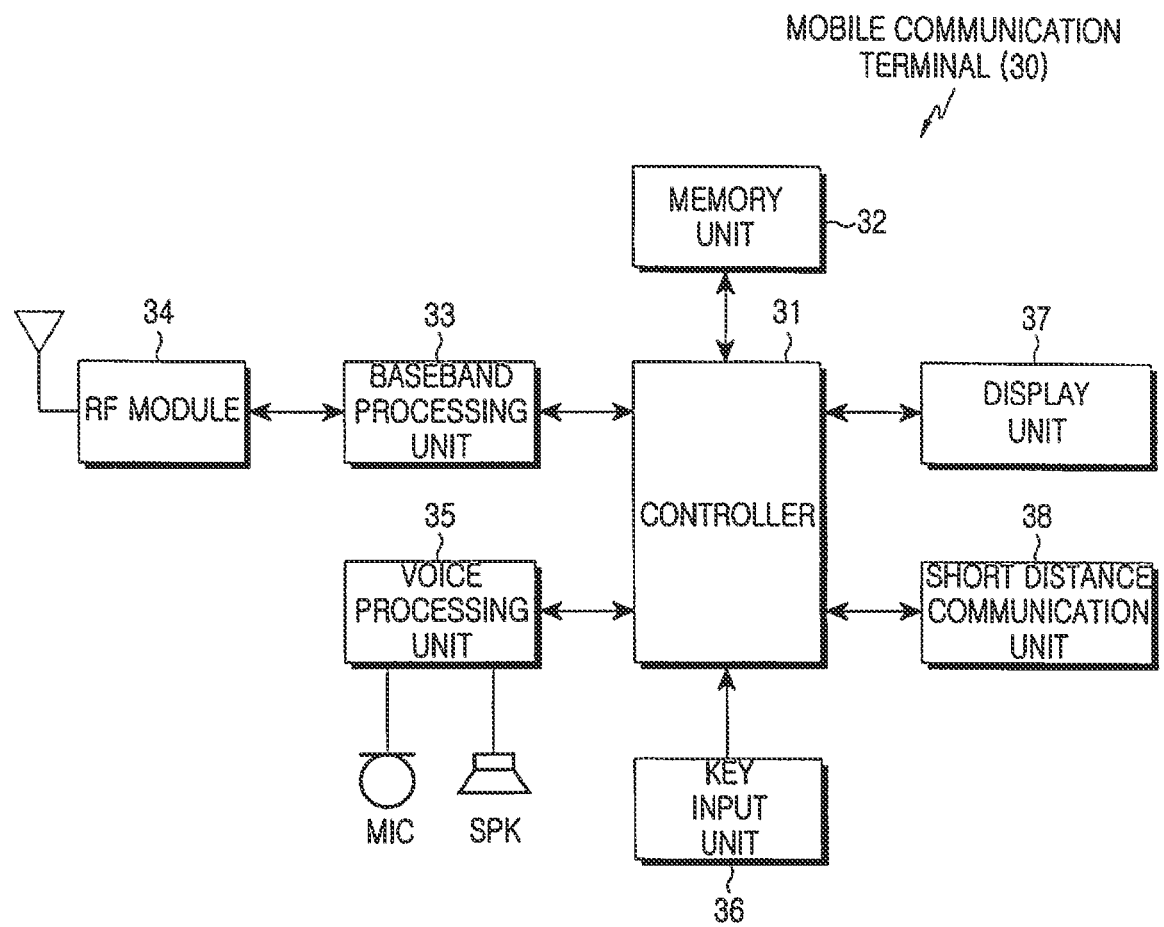
FIG. 4 is a block diagram illustrating a mobile communication terminal and an exclusive navigation terminal according to the present invention.
Figure 4:
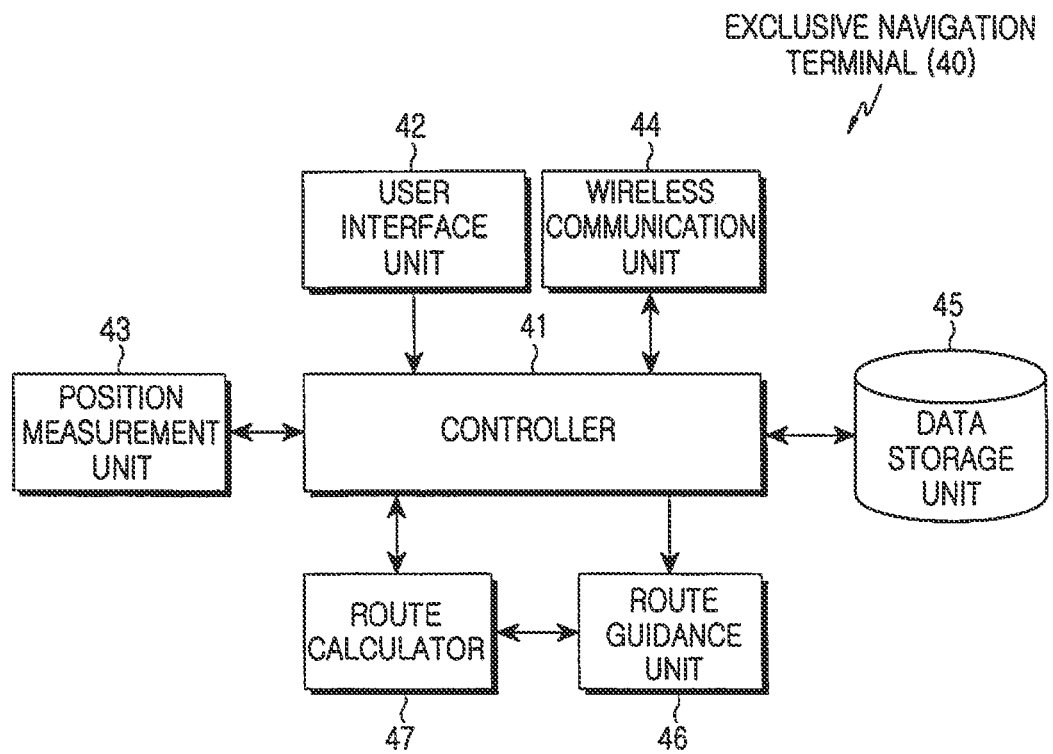

According to the present invention, a configuration and its operation of the exclusive navigation terminal 40 not having the mobile communication function to set destination position coordinates corresponding to position information input from the mobile communication terminal 30 connected thereto will be described herein with reference to FIGS. 4 and 7. FIG. 4 is a block diagram of the mobile communication terminal 30 and the exclusive navigation terminal 40 according to the present invention.

Referring to FIG. 4, the mobile communication terminal 30 includes a controller 31, a memory unit 32, a display unit 37, a key input unit 36, a baseband processing unit 33, a Radio Frequency (RF) module 34, a voice processing unit 35, and a short distance communication unit 38.

The controller 31 controls the display unit 37 to display various kinds of image information and an image received from a BTS or stored in the memory unit 32 on a screen. The key input unit 36 includes a * key, a # key, and various function keys, such as menu, select, send, cancel, power/end, volume, capture keys corresponding to various functions performed by the mobile communication terminal 30 and provides key input data corresponding to a key pressed by a user to the controller 31. The key input unit 36 also includes character keys to which numerals 0 to 9 and a plurality of Korean or English alphabet letters are allocated together. The RF module 34 transmits/receives an RF signal to/from the BTS via an antenna. In detail, the RF module 34 modulates a signal to be transmitted, which is input from the controller 31 via the baseband processing unit 33, to an RF signal and transmits the RF signal via the antenna, and demodulates an RF signal input via the antenna and outputs the demodulated signal to the controller 31 via the baseband processing unit 33. The baseband processing unit 33 processes a baseband signal communicated between the RF module 34 and the controller 31.

The voice processing unit 35 connected to the controller 31 and a microphone MIC and a speaker SPK connected to the voice processing unit 35 are used to make a phone call or record voice. The memory unit 32 stores programs for processing and controlling of the controller 31, reference data, and various types of updatable storage data and is provided as a working memory of the controller 31. The short distance communication unit 38 includes a short distance wireless communication module such as a Bluetooth® module, a Universal Serial Bus (USB) communication module, and a USB port, and it performs short distance communication under a control of the controller 31.

In particular, the short distance communication unit 38 performs short distance communication with the exclusive navigation terminal 40 according to the present invention. The controller 31 controls a general operation of the mobile communication terminal 30.

If a multimedia message is received, the controller 31 determines whether the received multimedia message is a position information multimedia message 80, and if the received multimedia message is a position information multimedia message 80, the controller 31 detects position information included in the position information multimedia message 80 and transmits the detected position information to the exclusive navigation terminal 40 through the short distance communication unit 38. The controller 31 inserts the position information received from the exclusive navigation terminal 40 through the short distance communication unit 38 into a multimedia message and transmits the multimedia message to a certain terminal. The controller 31 also transmits a position information multimedia message 80 including an address input by the user to a certain terminal.

The exclusive navigation terminal 40 includes a controller 41, a user interface unit 42, a position measurement unit 43, a short distance communication unit 44, a data storage unit 45, a route guidance unit 46, and a route calculator 47. The user interface unit 42 can include a keypad or a touch panel and performs an interface between a user and the exclusive navigation terminal 40. The short distance communication unit 44 includes a short distance wireless communication module such as a Bluetooth® module, a USB communication module, and a USB port, and it performs short distance communication under a control of the controller 41. In particular, the short distance communication unit 44 performs short distance communication with the mobile communication terminal 30 according to the present invention.

The data storage unit 45 stores map data and program data needed for the navigation service. The position measurement unit 43 receives a signal needed to calculate a current position, such as a GPS signal, and outputs the received signal to the controller 41. The route guidance unit 46 outputs the map data or performs a route guidance using route information and the map data. The controller 41 controls the route calculator 47 to calculate a current position of the exclusive navigation terminal 40 and outputs the calculation result to the route guidance unit 46, or calculates a route from a certain position to another position in response to a route search request, combines the calculation result with the map data, and outputs the combined result to the route guidance unit 46.

The controller 41 controls a general operation of the exclusive navigation terminal 40 and sets and stores a route search mode for each route, such as a start position, a passage course, and a destination, which are input through the user interface unit 42. If a current position calculation request or a route search request is input, the controller 41 controls the route calculator 47 to calculate a current position or a route corresponding to the set route search mode and performs a control required to output the calculation result. The controller 41 transmits the calculated current position coordinates to the mobile communication terminal 30 connected through the short distance communication unit 44. The controller 11 stores position information received from the mobile communication terminal 30 through the short distance communication unit 44, sets a desired destination by setting destination position coordinates corresponding to the position information in the route search mode, and requests the route calculator 47 to search a route between the set start position and desired destination.

An operation process between the mobile communication terminal 30 and the exclusive navigation terminal 40 is as follows. In a state where the mobile communication terminal 30 and the exclusive navigation terminal 40 are connected to each other through short distance communication, the exclusive navigation terminal 40 calculates a current position thereof, in response to a user's request and transmits position information including calculated position coordinates to the mobile communication terminal 30. The mobile communication terminal 30 creates a position information multimedia message 80 including the position information received from the exclusive navigation terminal 40 and transmits the created position information multimedia message 80 to a terminal selected by the user. The mobile communication terminal 30 detects position information from a received position information multimedia message 80 and transmits the detected position information to the exclusive navigation terminal 40 using short distance communication. The exclusive navigation terminal 40 stores the received position information, sets a destination by setting destination position coordinates according to a user's setting, and calculates a route between a start position set according to a user's selection and the desired destination.

A process of transmitting position coordinates of the second terminal 20 from the second terminal 20 to the mobile communication terminal 30, transmitting the position coordinates from the mobile communication terminal 30 to the exclusive navigation terminal 40, and setting destination position coordinates for calculation of a route to a desired destination in the exclusive navigation terminal 40 will be described herein with reference to FIG. 7. FIG. 7 is a signaling diagram illustrating a message flow of the navigation system illustrated in FIG. 1, according to of the present invention.

Figure 7:
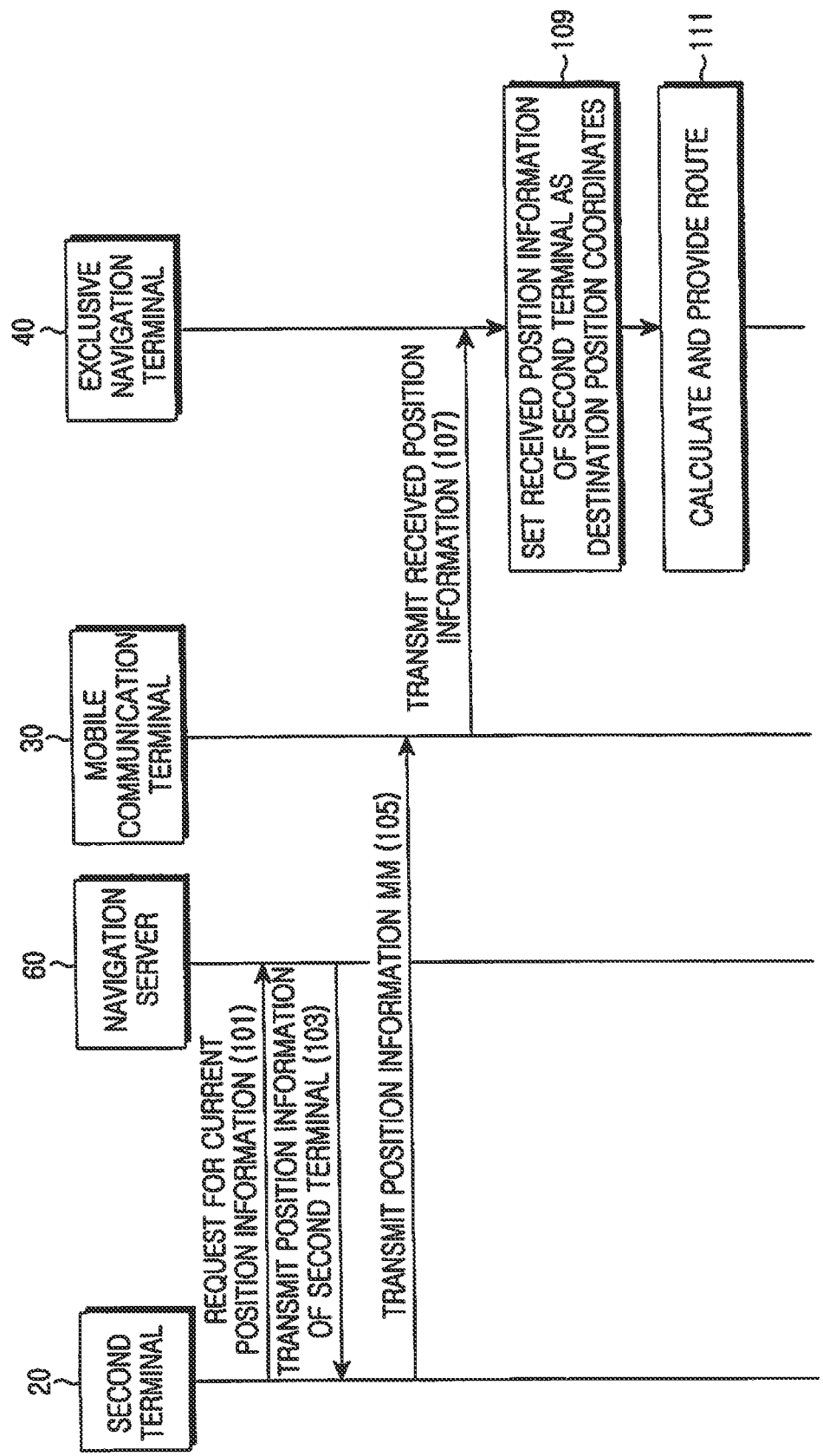
FIG. 7 is a signaling diagram illustrating a message flow of a navigation system according to of the present invention.

Referring to FIG. 7, the second terminal 20 requests the navigation server 60 for current position information thereof in step 101. The navigation server 60, which has received the current position information request, calculates a current position of the second terminal 20 and transmits the calculation result to the second terminal 20 in step 103. The second terminal 20 inserts the received position coordinates into a position information multimedia message 80 and transmits the position information multimedia message 80 to the mobile communication terminal 30 through the mobile communication network 50 in step 105. The mobile communication terminal 30 detects position information included in the position information multimedia message 80 and transmits the detected position information to the exclusive navigation terminal 40 connected thereto through short distance communication in step 107. The exclusive navigation terminal 40 sets destination position coordinates corresponding to the received position information of the second terminal 20 in step 109. The exclusive navigation terminal 40 calculates a route between a pre-set start position and the desired destination and provides the calculated route to a user in step 111.

As described above, a certain terminal can inserts position information into a multimedia message and transmit the multimedia message to another terminal, and a navigation terminal, which has received a position information multimedia message, can set a destination by setting destination position coordinates corresponding to position information included in the position information multimedia message. Thus, even if a user does not correctly know destination position information, the user can set a correct destination needed for a navigation service.

While the present invention has been shown and described with reference to a certain preferred embodiment thereof, it will be understood by those skilled in the art that various changes in form and details may be made therein without departing from the spirit and scope of the invention. For example, although a case where position information is included in a multimedia message has been described, the invention can be applied to a case where position information is included in a short message. Thus, the spirit and scope of the invention is defined by the appended claims.

What is claimed is:

1. A method for displaying a route in a first electronic device, the method comprising:
    receiving a first message from a second electronic device;
    identifying first position information of the second electronic device included in the first message;
    receiving a user input for selecting the first message from a plurality of received messages, wherein each of the plurality of received messages includes respective position information;
    calculating second position information of the first electronic device;
    receiving route information between a start position and a destination position from a navigation server, wherein the start position corresponds to the second position information and the destination position corresponds to the first position information; and
    based at least on receiving the route information from the navigation server, displaying, on a display of the first electronic device, a route representing the received route information between the start position and the destination position.

2. The method of claim 1, wherein the first message is a multimedia message.

3. The method of claim 1, wherein identifying the first position information included in the first message comprises identifying a value of an identification field included in the first message.

4. The method of claim 1, wherein the destination position is set based at least on position coordinates corresponding to the first position information included in the first message.

5. The method of claim 1, further comprising:
    receiving a second user input for transmitting, a third message including the second position information of the first electronic device, and
    transmitting the third message, including the second position information of the first electronic device, to the second mobile device.

6. A first electronic device for displaying route, the first electronic device comprising:
    a display;
    a communication interface; and
    a processor configured to:
        receive, through the communication interface, a first message from a second electronic device;
        identify first position information of the second electronic device included in the first message;
        receive a user input for selecting the first message from a plurality of received messages, wherein each of the plurality of received messages includes respective position information;
        calculate second position information of the first electronic device;
        receive route information between a start position and a destination position to a navigation server, wherein the start position corresponds to the second position information and the destination position corresponds to the first position information; and
        based at least on receiving, through the communication interface, the route information from the navigation server, display, on the display, a route representing the received route information between the start position and the destination position.

7. The first electronic device of claim 6, wherein the processor is further configured to identify the first position information included in the first message identifying a value of an identification field included in the first message.

8. The first electronic device of claim 6, wherein the first message is a multimedia message.

9. The first electronic device of claim 6, wherein the destination position is set based at least on position coordinates corresponding to the first position information included in the first message.

10. The first electronic device of claim 6, wherein the processor is further configured to receive a second user input for transmitting, a third message including the second position information of the first electronic device, and transmit the third message, including the second position information of the first electronic device, to the second electronic device.

11. A non-transitory computer readable recording medium storing instructions executable by a processor of a first electronic device to cause the processor to at least:
    receive, through a communication interface of the first electronic device, a first message from a second electronic device;
    identify first position information of the second electronic device included in the first message;
    receive a user input for selecting the first message from a plurality of received messages, wherein each of the plurality of received messages includes respective position information;
    calculate second position information of the first electronic device;
    receive route information between a start position and a destination position from a navigation server, wherein the start position corresponds to the second position information and the destination position corresponds to the first position information; and
    based at least on receiving, through the communication interface, the route information from the navigation server, display, on a display of the first electronic device, a route representing the received route information between the start position and the destination position.

12. The non-transitory computer readable recording medium of claim 11, wherein the first message is a multimedia message.

13. The non-transitory computer readable recording medium of claim 11, wherein the instructions further cause the processor to identify the first position information included in the first message by identifying a value of an identification field included in the first message.

14. The non-transitory computer readable recording medium of claim 11, wherein the destination position is set based at least on position coordinates corresponding to the first position information included in the first message.

15. The non-transitory computer readable recording medium of claim 11, wherein the instructions cause the processor to receive a second user input for transmitting, a third message including the second position information of the first electronic device, and transmit the third message, including the second position information of the first electronic device, to the second electronic device.

* * * * *